T. G. McGONIGLE.
ROTARY ENGINE.
APPLICATION FILED NOV. 30, 1912.

1,154,645.

Patented Sept. 28, 1915.
2 SHEETS—SHEET 2.

Witnesses.
H. L. Trimble.
L. A. Kelly.

Inventor.
T. G. McGonigle,
by H. J. S. Dennison
Atty.

UNITED STATES PATENT OFFICE.

THOMAS GEORGE McGONIGLE, OF LAMBTON MILLS, ONTARIO, CANADA.

ROTARY ENGINE.

1,154,645.   Specification of Letters Patent.   Patented Sept. 28, 1915.

Application filed November 30, 1912. Serial No. 734,300.

*To all whom it may concern:*

Be it known that I, THOMAS GEORGE MC-GONIGLE, a subject of the King of Great Britain, and resident of the village of Lambton Mills, in the county of York, Province of Ontario, in the Dominion of Canada, have invented certain new and useful Improvements in Rotary Engines, as described in the following specification and illustrated in the accompanying drawings, that form part of the same.

The principal features of the present invention consist in certain novel details of construction and the arrangement of parts in a rotary engine of the type described in my United States Patent No. 995,076, dated June 13th, 1911.

The principal objects of the present invention are, to simplify the construction and operation of the engine and to devise a construction of machine which may be utilized either as an internal combustion engine or as a steam engine.

Figure 1:
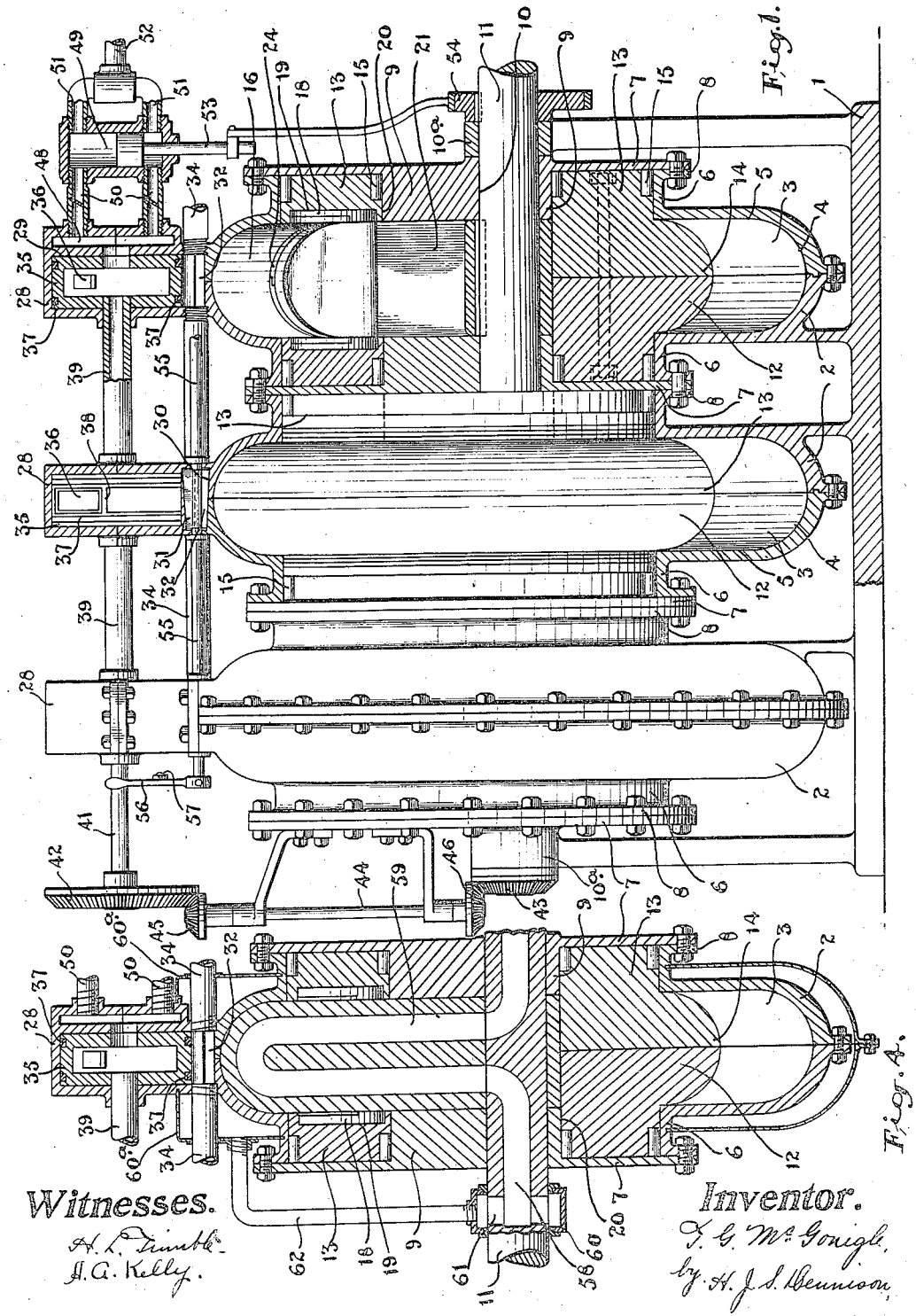
Figure 2:
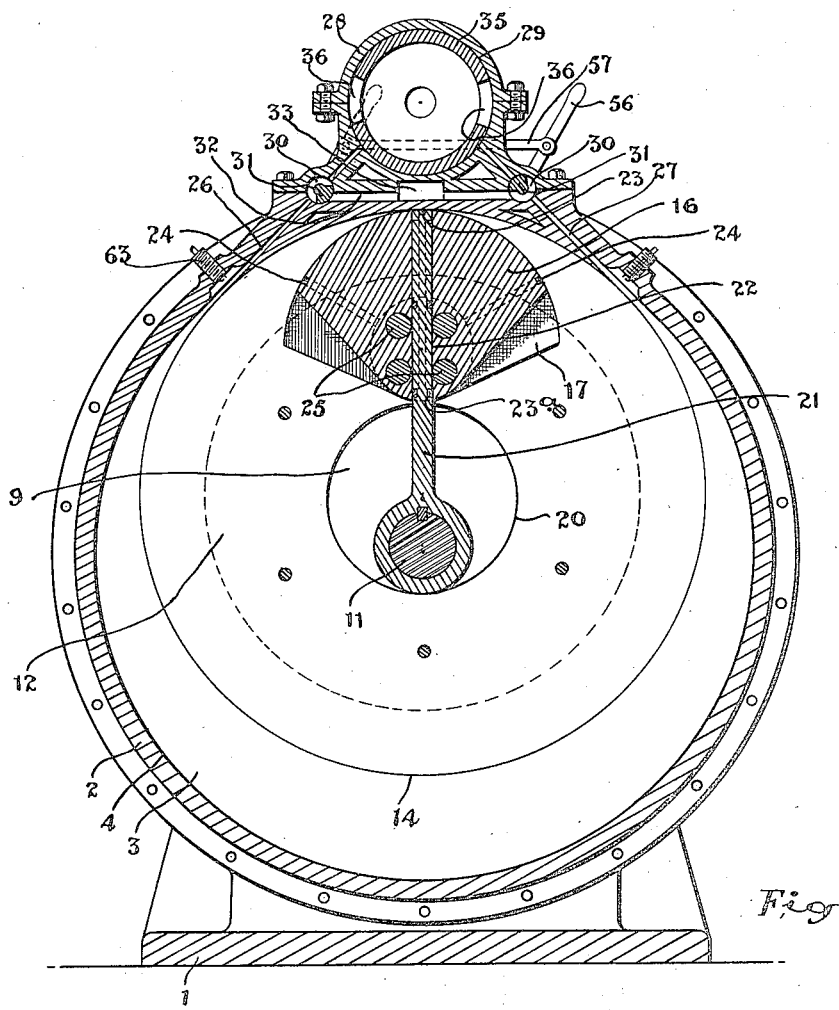
Figure 3:
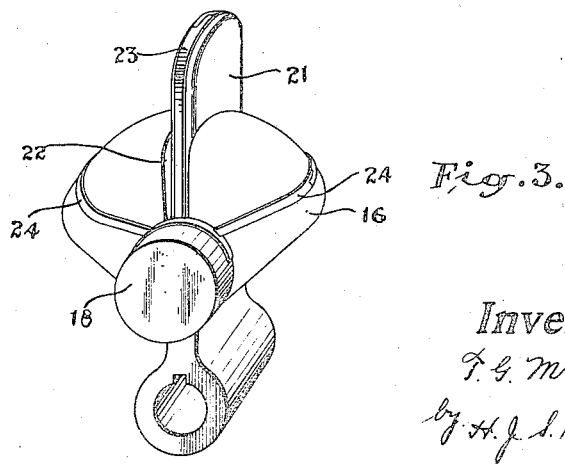

In the drawings, Figure 1 is an elevational view of a multiple unit engine constructed in accordance with this invention, showing one of the units in outside elevation, another in part sectional elevation and the other in central vertical sectional elevation. Fig. 2 is a transverse central sectional elevational view of one of the engine units. Fig. 3 is a perspective detail of the piston vane and oscillating member. Fig. 4 is a sectional detail of an engine unit showing an arrangement of water cooling passages.

Like numerals of reference indicate corresponding parts in each figure.

Referring to the drawings, 1 is the engine base.

2 are a plurality of circular casings supported from the base and inclosing the expansion chambers 3, said casings being here shown divided centrally of their width, the half sections being bolted securely together.

The interior walls of the circular expansion chambers 3 are formed with the inner peripheral surface 4 of semi-circular shape in cross section continuing from the flat side walls 5.

The casings 2 are formed with laterally extending cylindrical shaped portions 6 arranged eccentrically in relation to the expansion chambers 3.

7 are circular plates secured to the flanged edges 8 of the cylindrical portions 6 of the casings 2 and having the concentrically arranged circular shaped bosses 9 extending inwardly therefrom into the cylindrical portions 6, said bosses having the cylindrical orifices 10 eccentrically arranged therein and in concentric arrangement with the periphery of the expansion chambers 3 and through which the shaft 11 journaled at the ends in the bearings 10$^a$ extends.

12 are the rotor members formed with the annular extension portions 13 extending into the annular recesses formed between the cylindrical portions 6 and the bosses 9 and being journaled therein. The central portions 14 of the rotors extend outwardly past the cylindrical portions 6 into the expansion chambers 3 and the outer periphery of said central portion is formed semi-circular in cross section to fit the semi-circular cross sectional shape of the said expansion chambers so that the rotors contact with the inner surface of the expansion chambers where the eccentrically arranged peripheral surfaces meet. The rotor members are here shown supported on roller bearings 15 though any suitable style of bearings may be used.

16 is an oscillator member arranged within the arc shaped recess 17 formed in the rotor 12, said oscillator being journaled upon the cylindrical extensions 18 projecting into the circular recesses 19 in said rotor.

The rotor members 12 are formed with central circular openings 20 therethrough into which the bosses 9 of the plates 7 extend.

21 are the piston vanes secured to the shaft 11 and extending outwardly through a slot 22 in the oscillators 16 and having the outer ends formed semi-circular to fit the inner peripheral surface of the expansion chambers 3 in a close running fit.

23 are packing strips arranged in the edge faces of the piston vanes 21 and having the band portions 23$^a$ encircling the said piston vanes at a point intermediate of their length, the strips engaging the walls of the expansion chamber and band portions engaging the surfaces of the slot 22 in the oscillators making a steam tight joint therewith. The oscillators 16 are provided with packing members 24 engaging the inner walls of the recesses 17.

25 are roller bearings arranged within the oscillator and engaging the piston vanes and forming transverse bearings therefor.

26 and 27 are ports formed in the casings 2 at the top thereof and leading from the expansion chambers 3, said ports being preferably arranged approximately tangentially to the expansion chambers.

28 are cylindrical valve casings mounted on the casings 2, each having a centrally arranged cylindrical valve chamber 29 communicating with the ports 26 and 27.

30 are valve chambers formed in the casings 2 and arranged intermediate of the length of the ports 26 and 27 and preferably slightly tapered.

31 are segmental valves having circular tapered ends fitting the tapered valve chambers 30.

32 are transverse passages extending between the valve chambers 30 and communicating with a passage 33 arranged at right angles thereto and leading out through the side of the casing and forming the exhaust port. The passages 32 of each of the engine units are connected in series by the pipes 34 or the exhaust from each unit may be directed to a suitable exhaust pipe.

35 are cylindrical valves arranged within the valve chambers 29 and having the ports 36 through the circular wall thereof adapted to communicate with the ports 26 and 27 in rotation.

37 are spring packing rings arranged in grooves formed at each side of the ports 36, said rings being connected by transverse bar portions 38 extending across the ends of the ports 36 thereby forming a seal around said ports.

39 are lengths of pipe secured centrally in the end walls of the valves 35 and extending therebetween and forming a hollow shaft connection for operating said valves in unison.

41 is a shaft operatively connected to the valve 35 at one end of the group of units.

42 is a bevel gear wheel secured to the shaft 41.

43 is a bevel pinion secured to the main shaft 11.

44 is a shaft journaled in suitable bearings at the end of the machine having the bevel pinions 45 and 46 secured thereto and meshing with the bevel gears 42 and 43 thus forming the means for operating the rotary valves. A toothed gear connection for driving the valves is herein shown but it must be understood that a chain and sprocket connection may be used if desired.

The engine units are preferably arranged in series of three as shown and the piston vanes are so arranged that the impulses will be imparted at three different periods, thereby imparting uniform torque to the shaft. The valves are driven in unison and preferably at half speed and are arranged with their ports in the proper relative positions to open communication with the inlet ports to the expansion chambers just as the piston vane moves past the inner end of the said ports.

The port is retained open for a period in which the piston vane moves onward increasing the volume of the expansion chamber back of the vane in communication with the inlet. The further rotation of the valve 35 closes the inlet and the expansive force of the gas admitted is utilized to propel the piston through the remainder of its cycle of rotation. One end valve chamber 29 is here shown formed with an outer chamber 48 communicating with the valve chamber and the interior of the valve through the central openings 47 therein.

49 is a compressor here shown of a simple piston type having the discharge pipes 50 leading to the chamber 48 and the intake pipes 51 communicating with the common intake pipe 52 leading to a suitable carbureter which is not shown.

The piston of the compressor 49 is here shown operatively connected by means of a connecting rod 53 to an eccentric 54 on the main shaft. A small compressor of this type may be used but any other desirable form may be utilized without in any way departing from the spirit of the present invention. It may be found desirable to operate another rotary unit similar to those described as a compressor in place of a reciprocating compressor.

The tapered valves 31 are operatively connected together in series at each side of the engine by suitable spindles 55 and 56 are handles secured to the ends of said spindles.

57 is a link connecting the handles 56 so that when either handle is operated to turn the valves on one side to open or close the intake or exhaust the valves at the other side will operate in unison therewith to close or open the ports.

The cooling of the expansion chamber and the rotary piston vane may be accomplished by inclosing the said expansion chamber with a suitable water jacket 60ª as illustrated in Fig. 4 and the water may be circulated through the main shaft and the piston vanes through the passages 58 and 59.

60 is a casing encircling the outer end of the hollow shaft having communication with the hollow shaft through the slots 61 therein and the water is circulated through the pipe 62 back to the water jacket.

In the operation of this machine, as an internal combustion motor, the compressed gas is forced into the hollow rotary valves, passing from one valve to the other through the hollow shaft connecting the several valves in series.

On the rotation of the main shaft, the valve shaft is rotated to rotate the cylindrical valves within their respective casings preferably at half speed. The handles 56 are operated to turn the valves 31 to open the ports on one side of the power units, the valves at the other side communicating with the cylindrical valve chamber opening the inner portion of the port leading from the expansion chamber to the exhaust.

As the valves 35 rotate and move the ports therein to register with the inlet port, the compressed gas contained within the hollow valve flows through the port into the expansion chamber back of the rotating piston vane and at the pre-determined period the rotary valve cuts off the intake port from the main compressed supply. The charge is then ignited by the spark plug 63 arranged in the inlet passage.

When the ignition takes place the inlet port is closed by the rotary valve and the transverse port is closed by the tapered segmental valve but the port opening from the expansion chamber at the opposite side of the engine is opened to the exhaust, consequently as the piston receives the impulse of the charge the exhaust gases flow out through the passages 32 and 33 and the pipes 34.

The timing of the valves and spark mechanism may be regulated as desired in order to accomplish the best results.

In order to reverse the engine it is merely necessary to operate the handles 56 to rotate the valve 31 so as to close communication between the port 26 and the valve chamber 29 and opening the lower portion of the said port with the exhaust and coincidently closing communication between the port 27 and the exhaust and opening said port 27 to the cylindrical chamber 29.

The ports in the rotary valve are so arranged that when the movement is reversed the gases will be directed to the opposite side at the proper time to exert their pressure upon the rotating piston vane, said vane will have passed the port in the casing before the inlet takes place.

I have herein described my device as more particularly adapted to the internal combustion type of engine but it will be readily understood that the same arrangement of rotors and valves may be utilized for steam or compressed air propulsion or the device may be utilized as a compressor.

In the drawings, I have shown a series of three units but it must be understood that I may operate the units singly or may use any desirable number without in any way limiting my invention.

What I claim as my invention is:—

1. In a rotary engine, a casing having a circular expansion chamber, a rotor eccentrically journaled within said expansion chamber, a hollow shaft journaled eccentrically within said expansion chamber and extending transversely therethrough, a piston vane secured to said hollow shaft and having a water passage therein, communicating with the hollow shaft and extending outwardly to the end and returning to said shaft, a hollow casing encircling the end of said shaft extending beyond the main casing and having communication with the passage in said shaft through openings therein, a water jacket inclosing said expansion chamber, and a circulation pipe leading from the hollow casing encircling the shaft to said water jacket.

2. In a rotary engine, a plurality of circular casings each having a circular expansion chamber, a shaft extending transversely through said casings, rotors eccentrically journaled within said casings, radial piston vanes arranged within said casings and secured to said shaft and extending through said rotors, valve casings secured to said main casings and each having a pair of ports therein, ports in said main casing leading from the ports in said valve casings to the expansion chambers and arranged one at each side of the point of contact between the rotors and the wall of the expansion chambers, hollow cylindrical valves arranged in said valve casings, a hollow shaft extending between and rigidly connecting said rotary valves and adapted to convey the expansible fluid to said valves, means for rotating said hollow shaft, and means for directing the exhaust from said expansion chambers.

Signed at the city of Toronto, county of York, Ontario, Canada, this 1st day of November, 1912.

THOMAS GEORGE McGONIGLE.

Witnesses:
 E. HERON,
 A. G. KELLY.